United States Patent
Dembosky et al.

[19]

[11] Patent Number: 5,967,920
[45] Date of Patent: Oct. 19, 1999

[54] HYDRAULIC TENSIONER WITH A BORE CUP

[75] Inventors: Stanley K. Dembosky; Roger T. Simpson, both of Ithaca, N.Y.

[73] Assignee: Borg-Warner Automotive, Inc., Troy, Mich.

[21] Appl. No.: 08/947,594

[22] Filed: Oct. 9, 1997

[51] Int. Cl.[6] .............................. F16H 7/08; F16H 7/22; F16H 7/18
[52] U.S. Cl. ..................... 474/109; 474/111; 474/140
[58] Field of Search .................... 474/109, 111, 474/136, 138, 8, 18, 28, 101, 140

[56] References Cited

U.S. PATENT DOCUMENTS

| | | | |
|---|---|---|---|
| 4,190,025 | 2/1980 | Wahl | 123/90.31 |
| 4,507,103 | 3/1985 | Mittermeier | 474/110 |
| 4,826,470 | 5/1989 | Breon et al. | 474/110 |
| 4,850,941 | 7/1989 | Sosson | 474/110 |
| 4,894,047 | 1/1990 | Breon et al. | 474/110 |
| 4,940,447 | 7/1990 | Kawashima et al. | 474/110 |
| 4,963,121 | 10/1990 | Himura et al. | 474/110 |
| 4,983,144 | 1/1991 | Ojima | 474/111 |
| 5,004,448 | 4/1991 | Ojima | 474/111 |
| 5,033,992 | 7/1991 | Ojima | 474/111 |
| 5,037,357 | 8/1991 | Ojima | 474/111 |
| 5,073,158 | 12/1991 | Ojima | 474/111 |
| 5,277,664 | 1/1994 | Mott | 474/110 |
| 5,346,436 | 9/1994 | Hunter et al. | 474/110 |
| 5,385,507 | 1/1995 | Swearingen et al. | 474/111 |
| 5,653,652 | 8/1997 | Simpson | 474/111 |
| 5,700,213 | 12/1997 | Simpson et al. | 474/111 |
| 5,707,309 | 1/1998 | Simpson | |
| 5,797,817 | 8/1998 | Senftleben et al. | |

FOREIGN PATENT DOCUMENTS

| | | |
|---|---|---|
| 4035823 | 12/1991 | Germany . |
| 4203449 | 8/1993 | Germany . |
| 29613535 | 9/1996 | Germany . |
| 19632383 | 2/1997 | Germany . |

OTHER PUBLICATIONS

European Search Report in counterpart EPO application No. 98308174 dated Jan. 29, 1999.

*Primary Examiner*—Tamara L. Graysay
*Assistant Examiner*—Matthew A. Kaness
*Attorney, Agent, or Firm*—Sidley & Austin; Greg Dziegielewski

[57] ABSTRACT

A hydraulic tensioner is designed for low cost and ease of manufacturing. A piston housing has a bore and a bore cup member received within the bore. A piston is slidably received within the bore cup member, forming a high pressure fluid chamber with the bore cup member. The piston housing can be constructed of inexpensive materials such as aluminum or plastic. The piston and bore cup member are constructed of drawn metal. A single channel connects the pressure chamber to an external source of fluid, and a single valve system regulates the flow of fluid into the pressure chamber. The inexpensive materials and simple design provide for a low cost hydraulic tensioner.

8 Claims, 3 Drawing Sheets

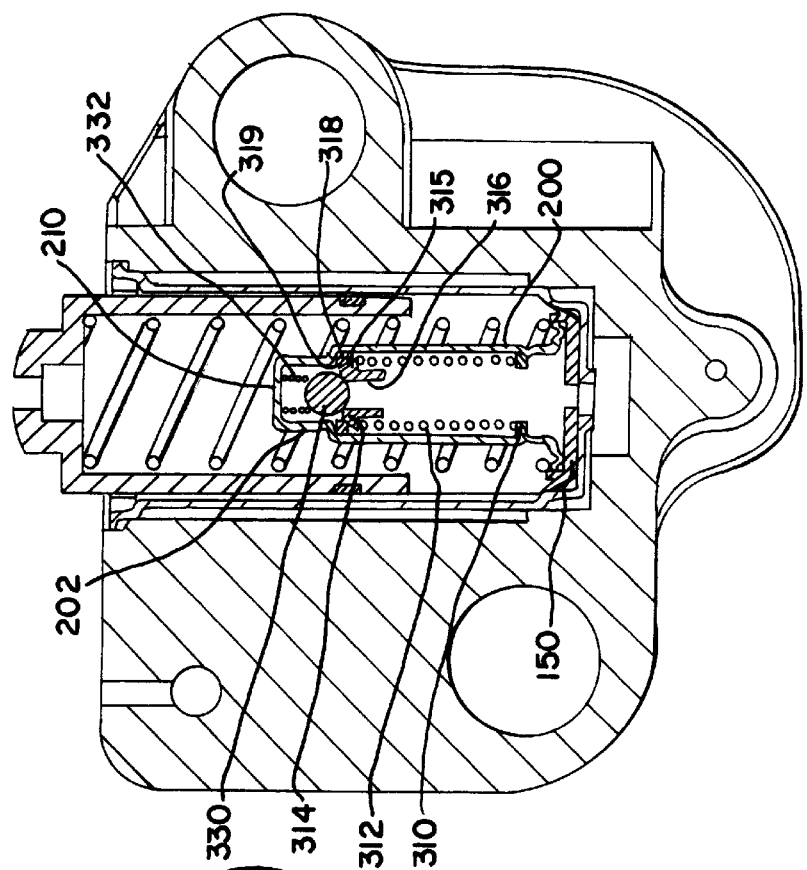
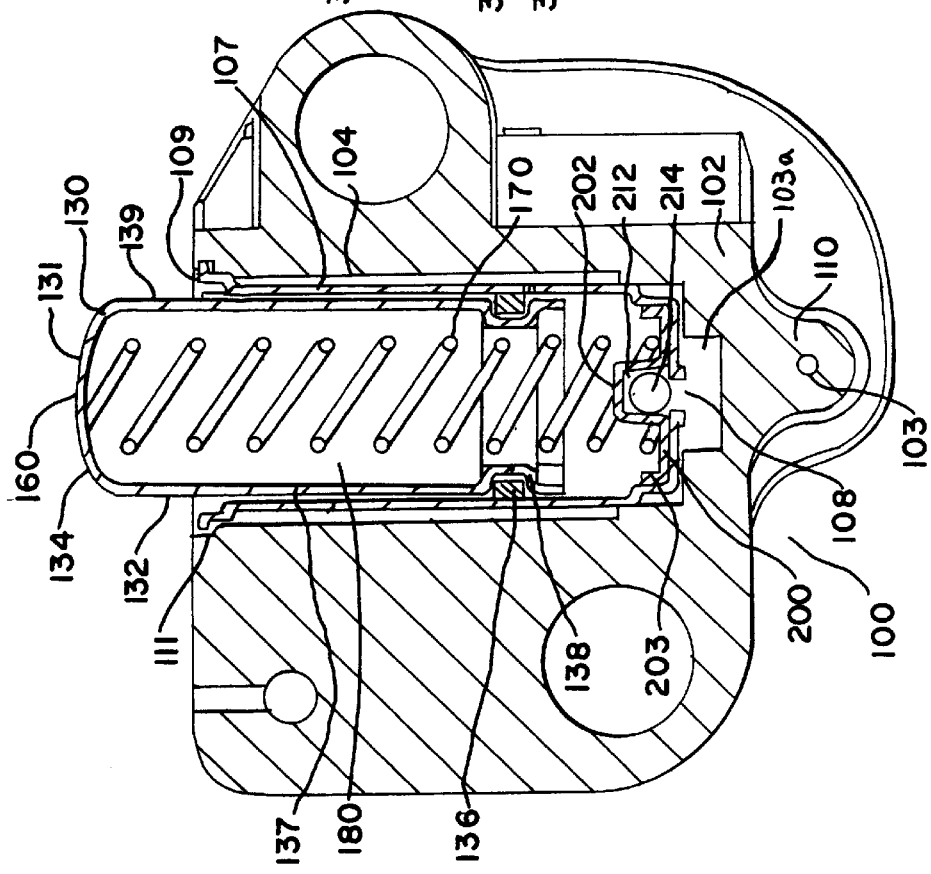

HYDRAULIC TENSIONER WITH A BORE CUP

Reference is made to application Ser. No. 08/573,181, filed Dec. 15, 1995, now U.S. Pat. No. 5,297,817 entitled "Hydraulic Tensioner With Internal Reservoir," the subject matter of which relates to the present invention.

Reference is also made to application Ser. No. 08/788,039, filed Jan. 23, 1997, now U.S. Pat. No. 5,707,809 entitled "Hydraulic Tensioner With Modular Inlet Check Valve With Pressure Relief," the subject matter of which relates to the present invention.

Reference is also made to copending application Ser. No. 08/948,205, filed Oct. 9, 1999, entitled "Hydraulic Chain Tensioner With Plastic Molded Body," filed concurrently with this application, which is incorporated herein by reference.

BACKGROUND OF THE INVENTION

A tensioning device, such as a hydraulic tensioner, is used as a control device for a power transmission chain, or similar power transmission device, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain.

Prevention of such slippage is particularly important in the case of a chain driven camshaft in an internal combustion engine because jumping of teeth will throw off the camshaft timing, possibly causing damage or rendering the engine inoperative. However, in the harsh environment of an internal combustion engine, various factors can cause fluctuations in the chain tension.

For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain, when the chain is slack, and must be very rigid when the chain tightens.

To accomplish this result, a hydraulic tensioner typically comprises a rod or cylinder as a piston, which is biased in the direction of the chain by a tensioner spring. The piston is housed within a cylindrical piston housing, having an interior space which is open at the end facing the chain and closed at the other end. The interior space of the piston housing contains a pressure chamber in connection with a reservoir or exterior source of hydraulic fluid. The pressure chamber is typically formed between the piston housing and the piston, and it expands or contracts when the piston moves within the piston housing.

Typically, valves are employed to regulate the flow of fluid into and out of the pressure chamber. For instance, an inlet check valve typically includes a ball-check valve that opens to permit fluid flow in to the pressure chamber when the pressure inside the chamber has decreased as a result of outward movement of the piston. When the pressure in the pressure chamber is high, the inlet check valve closes, preventing fluid from exiting the pressure chamber, which in turn prevents the piston chamber from contracting, which in turn prevents the piston from retracting, achieving a so-called "no-return" function.

In some tensioners, a pressure relief valve allows the tensioner to retract in response to large increases in chain tension. The pressure relief valve typically includes a spring biased check valve. This valve opens when the pressure in the pressure chamber becomes high. The opening of the pressure relief valve allows fluid to exit the pressure chamber, which allows the pressure chamber to contract, thus allowing retraction of the piston.

In operation, the tensioner spring and hydraulic fluid urge the piston outwards, balanced against the inward force of the chain. As the tension in the chain increases, the chain exerts a force on the piston in the direction of piston retraction. As the piston is forced in the retraction direction, the fluid pressure in the pressure chamber increases, but the inlet check valve prevents the fluid from exiting the pressure chamber. If the pressure increases to a predetermined level, the pressure relief valve opens, allowing the fluid to exit the pressure chamber.

If, due to chain wear or other factors, the tension in the chain reduces so that the force of the chain on the piston no longer balances the combined force of the hydraulic pressure and the tensioner spring, then the piston will extend toward the chain, thereby tensioning the chain. As the piston extends toward the chain, the inlet valve opens, allowing hydraulic fluid from the external source of fluid to fill the pressure chamber.

A number of challenges exist in the design of hydraulic tensioners, including high cost and difficulty of manufacture and assembly. Traditionally, hydraulic tensioners have been constructed of cast iron housing bodies with turned and centerless ground pistons. This type of construction is expensive and difficult to manufacture. A need exists for a lower cost hydraulic tensioner which is easier to manufacture and assemble.

One example of a tensioner design directed to reduced cost is described in Ojima et al., U.S. Pat. No. 5,037,357. Ojima et al. disclose a spring loaded tensioner including a body having a bearing surface, a first spring seated against the bearing surface and biasing a piston in a protruding direction. A second spring functions as a damper allowing the piston to retract in response to increasing tension in the belt or chain. The body may be made of sheet metal, allowing for low cost manufacturing. The disadvantages of this design include the reliance on springs to provide the "no return" and pressure relief functions. As a result, this design does not provide the advantages in performance provided by a hydraulic tensioner.

The present invention is directed to a lower cost hydraulic tensioner. A housing body has a bore, and a bore cup received in the bore. The bore cup may be deep drawn of a suitable metal. A piston is slidably received in the bore cup, forming a pressurized fluid chamber with the inside of the bore cup. The piston may also be constructed of drawn metal. Preferably, the fluid chamber is connected to the external source of fluid by a single passage. A valve system is assembled within a valve housing which is positioned within the piston. The valve system performs the inlet check function. In one embodiment, the valve system includes an integral inlet and pressure relief valve which performs both the inlet check function and the pressure relief function.

Because the pressure chamber is formed with the bore cup, rather than the housing body as in conventional tensioners, the housing body of the present invention can be constructed of materials, such as aluminum or plastic, which are less expensive than the cast iron which is employed by conventional tensioners. In addition, the positioning of the valve system within the bore cup eliminates the need to provide a valve system within the housing body. Thus, the positioning of the valve system within the bore also reduces the cost of the tensioner.

Furthermore, the design, employing a single passage connecting the pressure chamber with the external source of fluid, in contrast to a design having two or more passages connecting to the fluid chamber, also simplifies the design of the housing body, allowing for a lower cost hydraulic tensioner. In operation, the single passage design also reduces the amount of pressure fluid lost to the system, resulting in a more efficient and less costly tensioner system.

In some embodiments, the inlet check valve assembly employs the aperture in the bore cup as a valve seat. This design provides for a lower cost valve assembly compared to designs employing a separate member as a valve seat.

Accordingly, it is an object of the present invention to provide a hydraulic tensioner capable of improved response to fluctuations in chain tension. Another object of this invention is to provide a hydraulic tensioner for which the cost of manufacture is lower than the cost of conventional hydraulic tensioners. Another object of this invention is to provide a hydraulic tensioner having a housing body constructed of an inexpensive material. A further object of the invention is to provide a hydraulic tensioner having a bore cup, piston and/or a valve housing constructed of drawn metal. Still another object of this invention is to provide a hydraulic tensioner allowing for ease of manufacture and assembly.

SUMMARY OF THE INVENTION

The present invention concerns a tensioner which can be manufactured at a reduced cost compared to conventional tensioners. According to one aspect of the present invention, there is provided a tensioner for a wrapped power transmission device, e.g. a chain linking at least two rotating members such as a pair of sprockets. A housing body has a bore and a bore cup positioned within the bore. A piston slidably fits within the bore cup, forming a pressure chamber with the bore cup. A spring is contained within the pressure chamber biasing the piston outward from the housing bore.

The bore cup and piston may be manufactured by drawing. Because the pressure chamber is formed by the bore cup and the piston, the housing body can be constructed of a variety of materials, such as iron, aluminum, or plastic. The structure of the bore cup is not necessarily limited to a cup shape, and may include other shapes such as a hollow cylinder, cylindrical sleeve, or split member with a plurality of sections.

A valve housing is positioned within the piston spring. This valve housing is a hollow structure, positioned against an aperture in the piston housing connecting the pressure chamber to an external source of fluid. The valve housing may be press fit into the bore cup and may also be constructed of drawn metal.

Inside the valve housing are assembled valves regulating the flow of fluid in to and out of the pressure chamber.

Preferably, an inlet check valve is employed. This check valve includes a spring seated against the valve housing which biases a valve member toward a valve seat. The inlet check valve may employ the aperture in the bore cup as a valve seat.

Alternatively, an integral inlet and pressure relief valve may be positioned within the valve housing. This valve has the effect of permitting fluid to flow in to the pressure chamber, but to only permit fluid to exit the pressure chamber when the pressure in the pressure chamber reaches a certain specified limit. This regulation of the fluid flow provides for a tensioner responsive to fluctuations in chain tension, and the positioning of the valve within a single valve housing provides advantages of assembly and manufacture.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale,

FIG. 4 is a side cross sectional view of another embodiment of the present invention;

FIG. 5 is a side cross sectional view of another embodiment of the present invention.

DETAILED DESCRIPTION OF THE PREFERRED EMBODIMENTS

Turning now to the drawings, the present invention is directed to providing a hydraulic tensioner which can be manufactured at a lower cost than conventional tensioners. The tensioner includes a bore cup and a piston forming a pressurized fluid chamber. Because the pressure chamber is formed by the bore cup, the housing body can be constructed of an inexpensive material. The bore cup, piston, and valve housing may be constructed of drawn metal, further reducing the cost of manufacturing the tensioner. Furthermore, a single conduit connects the pressure chamber to an external source of fluid, and a single valve system is positioned within the piston to regulate the flow of fluid in to and out of the pressure chamber. This simple design also reduces the cost of the tensioner.

Figure 1:
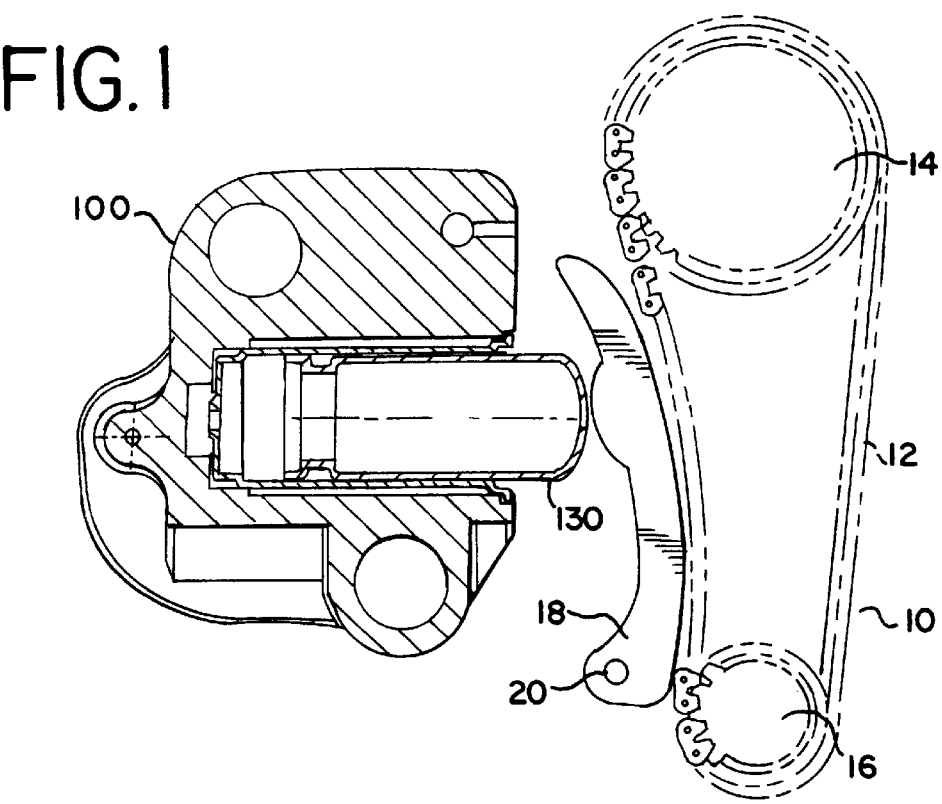
FIG. 1 is a side view of one embodiment of the present invention, a power transmission device operating with a hydraulic tensioner.

FIG. 1 illustrates one embodiment of the present invention. A power transmission device 10 comprises a chain 12 operating between two sprockets 14, 16. A lever arm 18 mounted on a pivot 20 presses against the chain to maintain tension. A hydraulic tensioner 100 has a piston 130, which applies force to the lever arm 18.

Figure 2:
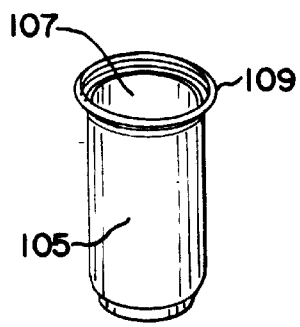
FIG. 2 is a perspective view of a bore cup of one embodiment of the tensioner of the present invention.
Figure 3A:
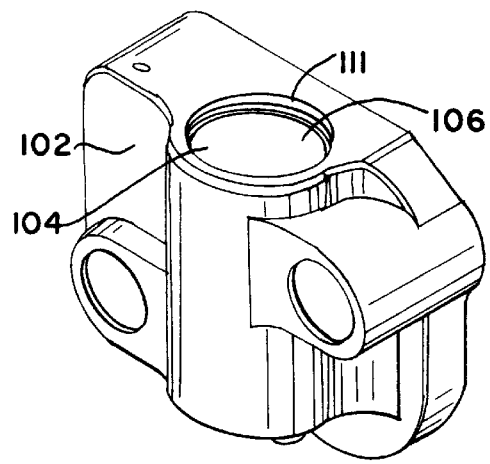
FIGS. 3a and 3b are perspective views of a piston housing of one embodiment of the present invention.
Figure 3B:
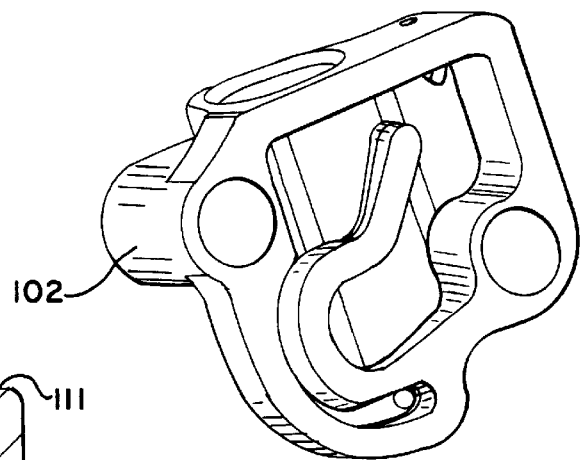
Figure 3C:
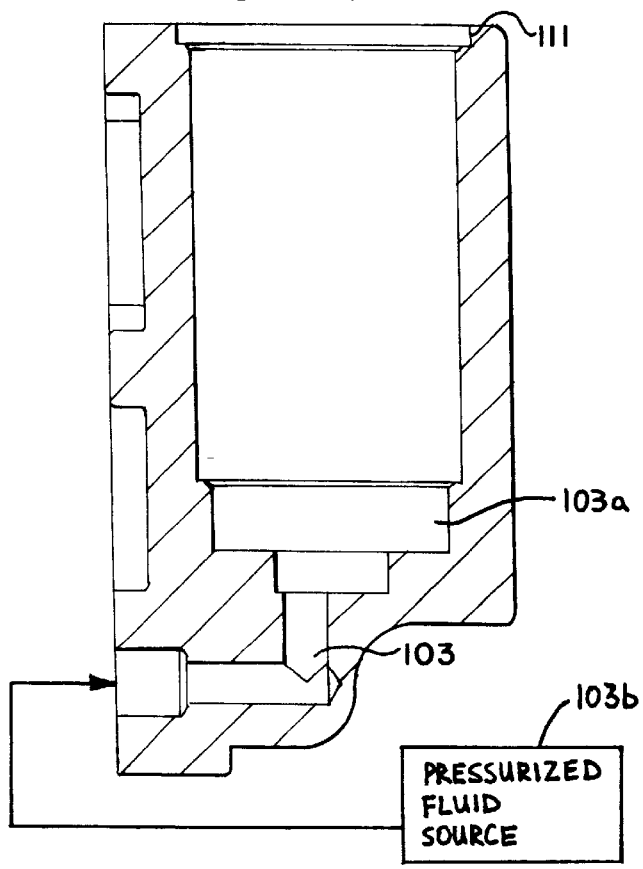
FIG. 3c is an end cross sectional view of the piston housing shown in FIGS. 3a and 3b.

FIGS. 2 and 3 show one embodiment of the present invention. The tensioner 100 includes a piston housing 102 having a bore 104 and an inner surface 106 on this bore. A bore cup 105 is received within the bore 104 of the housing body 102. Preferably, the bore and bore cup are substantially cylindrical in shape. In one embodiment, the bore cup is press fit into the bore. For instance, the bore cup 105 may have a lip 109 at its open end which can be press fit into a counterbore 111 in the piston housing bore 104. Other means of securely fixing the bore cup within the bore, including methods known in the art employing friction and/or mechanical interlocking, may also be used within the scope of the present invention.

Figure 6:
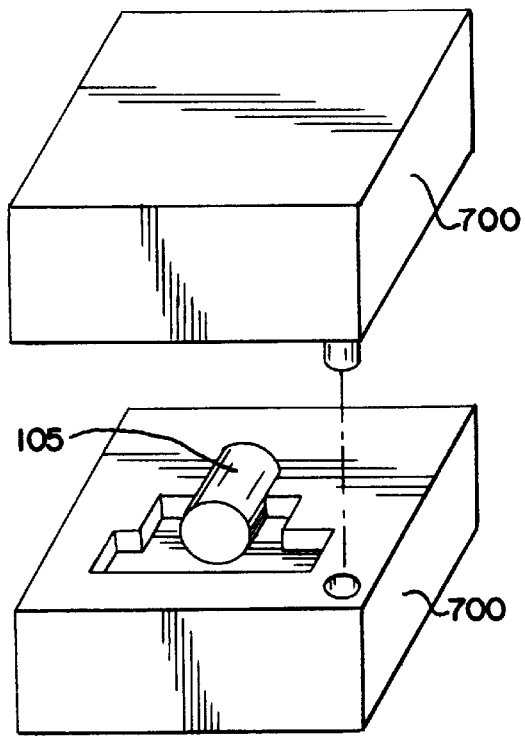
FIG. 6 is a highly schematic perspective of another embodiment of the present invention, a method of manufacturing a hydraulic tensioner.

In another embodiment of the present invention, shown generally in FIG. 6, the bore cup is positioned in the piston housing 102 by injection molding. The bore cup 105 is constructed by a means known in the art, such as drawing, stamping, or casting. The bore cup is then inserted into a mold 700 suitable for forming the desired piston housing. The plastic piston housing is then constructed around the bore cup by injection molding.

FIG. 4 is a side cross sectional view of one embodiment of the present invention. The piston housing bore 104 is connected by a channel 103 to the external source of fluid 103b shown in FIG. 3c. The bore cup 105 has an aperture 108 aligned with the channel inlet 103a so that the interior of the bore cup is in connection with the external source of fluid.

A piston 130, which is preferably cylindrical, is slidably assembled within the bore cup 105. This piston comprises a hollow body 132 with a closed end 134. In some embodiments, this closed end 134 may have a vent 160 which drains air and some fluid from the piston housing 102.

In some embodiments, a seal ring 136 is housed in a groove 138 on the outer circumferential surface 139 of the piston. This seal ring 136 forms a seal between the piston outer circumferential surface 139 and the bore cup 105. In other embodiments, the seal ring may be housed on the inner surface of the bore cup 105. The groove may be formed by rolling or other methods well known in the art.

Assembled concentrically within the piston 130 is the piston spring 170. The piston spring 170 biases the piston 130 out of the piston housing 102 so that the piston tip 131 pushes against the lever arm 18, as shown is FIG. 1.

Thus, a high pressure fluid chamber 180 is formed within the piston housing 102. The fluid chamber is formed by the inner surface 137 of the piston and the inner surface 107 of the bore cup 105. The seal ring 136 prevents fluid from escaping the high pressure fluid chamber through the space between the piston 130 and the inner surface 107 of the bore cup 105. Thus, the fluid chamber 180 increases in size when the piston 130 moves in the protruding direction.

Assembled within the piston spring 170 is the valve housing 200. The valve housing comprises a hollow body having an inner chamber in connection with the external source of fluid and at least one aperture 202 in connection with the fluid chamber 180. In the preferred embodiment, the valve housing hollow body is roughly cylindrical, but other shapes could also be employed. The valve housing 200 is securely fixed within the bore cup 105 by means such as a press fit, or by other methods known in the art employing friction and/or mechanical interlocking. Additionally, the valve housing may have a lip or flange 203 to facilitate a secure fit within the bore cup. Alternatively, as shown in FIG. 5, a seal plug 150 may be positioned between the valve housing and bore cup to facilitate a seal therebetween.

The valves which regulate fluid flow in to and out of the high pressure fluid chamber 180 are assembled within the valve housing 200. In one preferred embodiment, an inlet check valve is employed. This valve allows fluid to flow from the external source of fluid into the fluid chamber 180, but does not permit fluid to flow in the reverse direction.

The inlet check valve includes a spring 212 seated against the valve housing 200. The spring 212 biases a valve member 214 in a direction away from the valve housing aperture 202. In the embodiment shown in FIG. 4, the valve member 214 seats against the aperture 108 in the bore cup. In other embodiments, a separate valve seat member may be employed. Valve seats suitable for use with an inlet check valve are well known in the art. For instance, a valve seat having a body including an air vent connecting the fluid chamber and the external source of fluid may be employed within the scope of the present invention.

Preferably, the valve member 330 is a ball, but it may have various geometric configurations. For example, the valve member 330 may be a disk or a tapered plug (not shown). If a tapered plug is used, the smaller tapered end will be position near the pressure relief disk 314 and the larger base end will be adjacent to the inlet check spring 332. The exact configuration will, of course, depend on the dynamic response desired. For example, a solid ball will have a greater mass and thus a slower response time and a lower natural frequency compared to a small light weight disk, or even a hollow metal ball. The valve member may also be constructed of ceramic or engineered plastics, such as polymide or polyetheretherketone (PEEK).

FIG. 5 is a side cross sectional view of another embodiment of the present invention, wherein an integral inlet and pressure relief valve is assembled within the valve housing 200. The integral inlet and pressure relief valve, which performs both an inlet check function and a pressure relief function, comprises a number of components. A spring retainer washer 310 is assembled within the valve housing 200 such that its axial position with respect to the valve housing is fixed. A pressure relief spring 312 is mounted on the spring retainer washer 310 concentric with the valve housing 200. An annular pressure relief disk 314 is positioned concentrically within the valve housing at the end of the pressure relief spring 312 which is opposite the spring retainer washer 310. In this way, the pressure relief spring 312, braced against the fixed spring retainer washer 310, biases the pressure relief disk 314 toward the aperture 202 leading to the high pressure fluid chamber 180. The pressure relief disk has an outside diameter 315 and an inside diameter 316.

Biased toward the closed end 210 of the valve housing 200, the pressure relief disk 314 seats against a pressure relief seat 318. In one preferred embodiment, this pressure relief seat 318 is braced against the valve housing 200, having an inside diameter 319 less than the outside diameter 315 of the pressure relief disk 314. However, the pressure relief seat may be any component longitudinally fixed with respect to the valve housing 200 and capable of forming a seal with the pressure relief disk 314. When pressure in the fluid chamber exceeds a predetermined maximum level, the pressure relief disk 314 moves away from the pressure relief seat 318 to release pressure.

In the integral inlet and pressure relief valve, the pressure relief disk 314 also serves as a seat for the inlet check valve member 330. In one preferred embodiment, this valve member is a ball having a diameter greater than the inside diameter 316 of the pressure relief disk 314, but less than the inside diameter 319 of the pressure relief seat 318. Thus, the valve member is free to move axially within the pressure relief seat 318, but it is too large to pass through the inside diameter of the pressure relief disk 314.

The valve member 330 is biased away from the closed end 210 of the valve housing 200 by an inlet check spring 332. This spring is seated against the closed end 210 of the valve housing on one end and against the valve member 330 on the other end. Thus, the inlet check spring 332 biases the valve member 330 against the pressure relief disk 314. When pressure in the high pressure fluid chamber drops below a predetermined minimum, as a result of outward movement of the piston, the inlet check spring compresses, opening the inlet valve to permit fluid to enter the high pressure fluid chamber.

In this way, a valve is formed within the valve housing 200 that functions as both an inlet check valve and a pressure relief valve. The valve member 330 is biased against the inner diameter 314 of the pressure relief disk 314, forming a first seal. The pressure relief disk 314 is biased against the pressure relief seat 318, forming a second seal. Under static conditions, these two seals combine to prevent fluid from passing through the valve housing, and thus they form a seal between the high pressure fluid chamber 180 and the external source of fluid.

The inlet check function is performed at the first seal. Under typical conditions, the first seal prevents any fluid from entering the high pressure fluid chamber 180. However, if the pressure in the high pressure fluid chamber 180 becomes less than the pressure in the external source of fluid, a force will be applied on the valve member 330 urging the valve member open, toward the closed end 210 of the valve housing 200. This force is resisted by the inlet check spring 332. If the pressure in the high pressure fluid chamber becomes low enough, the valve member 330 will unseat from the pressure relief disk, opening the first seal. Fluid will then flow from the external source, through the inner diameter 316 of the pressure relief disk 314, past the valve member 330, and into the high pressure fluid chamber 180. Thus the spring force of the inlet check spring dictates the pressured required to allow fluid to flow into the high pressure fluid chamber 180 from the external source.

The pressure relief function is performed at the second seal, between the pressure relief disk 314 and the pressure relief seat 319. Under typical conditions, this seal prevents fluid from exiting the high pressure fluid chamber 180. Hydraulic pressure, applied by the fluid against the outside of the pressure relief disk, and applied by the fluid against the valve member 330 and then from the valve member 330 against the inside of the pressure relief disk 314, urges the pressure relief disk open, away from the pressure relief seat 318. This force is resisted by the pressure relief spring 312. If the pressure from inside the high pressure fluid chamber becomes too great, the pressure relief disk 314 will unseat from the pressure relief seat 319, opening the second seal. Fluid will then flow from the high pressure fluid chamber, through the aperture 216 in the closed end 210 of the valve housing 200, through the space between the outside diameter 315 of the pressure relief disk 314 and the inside diameter 319 of the pressure relief seat 318, and to the external source of fluid. Thus, the strength of the pressure relief spring 312 dictates the pressure required in the high pressure fluid chamber that will permit fluid to exit the chamber.

The inlet check spring 332 and pressure relief spring 312 may be constructed of any steel customarily used for such services. The inlet check spring is typically designed for a cracking pressure of several PSI. The pressure relief spring, on the other hand, is typically set for a much higher cracking pressure of about 250 PSI.

In operation, the high pressure fluid chamber is filled with hydraulic fluid. If the power transmission chain is slack, the piston spring will cause the piston to extend. As the piston extends, the pressure in the high pressure fluid chamber decreases. When this pressure drops to a certain specified level, the inlet check valve will open, allowing fluid from the external source of fluid to enter the high pressure fluid chamber.

As the tension in the chain 12 increases, the chain applies force on the piston 130 through the lever arm 18. Because the inlet check valve does not permit fluid to exit the high pressure fluid chamber, this force causes an increase in pressure inside the high pressure fluid chamber. In an embodiment employing a pressure relief valve, when the pressure exceeds a certain specified level, the pressure relief valve opens, and fluid exits the high pressure fluid chamber through the valve housing 200. In other embodiments of the present invention, fluid may drain from the fluid chamber through the vent hole 160 in the piston 130. The exit of this fluid from the fluid chamber 180 allows the piston 130 to retract.

The tensioner of the present invention is designed for low cost and ease of manufacture. Because the high pressure fluid chamber is formed between the bore cup 105 and the piston 130, the housing body 102 may be constructed of an inexpensive material such as plastic, aluminum, or iron. The bore cup 105, piston 130, and valve housing 200 may be constructed by drawing or deep drawing, which are less expensive than other methods of forming metals, such as casting.

In addition, the simple design of this tensioner also reduces the cost of manufacturing and assembling the tensioner. Positioning the valve system within piston cavity eliminates the need to position the valve system within the housing body 102. Also, the use of a single channel 103 connecting to the fluid chamber 180 further simplifies the housing body design. Furthermore, the use of the portion of the bore cup surrounding the bore cup aperture as an inlet check valve seat reduces the cost of the inlet check valve.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:
   a housing having a bore;
   said bore having an inlet in communication with a source of fluid;
   a hollow bore cup member separate from said housing, said bore cup member received within said bore and spaced apart from said bore along at least a portion of an outer surface of said cup member, said bore cup member having an inner surface and an aperture aligned with said inlet;
   a hollow piston slidably received within said bore cup member, said piston having an inner surface and an outer surface;

a piston spring positioned between said inner surface of said bore cup member and said inner surface of said piston, said piston spring biasing said piston in a direction away from said inside surface of said bore cup member;

said bore cup member inner surface and said piston inner surface positioned and configured to form a fluid chamber;

a check valve positioned within said chamber, said check valve positioned to permit the flow of fluid from said source of fluid into said chamber and restrict the flow of fluid out of said fluid chamber.

2. The hydraulic tensioner of claim 1, further comprising said inside surface of said cup member facing said inside surface of said bore cup member.

3. The hydraulic tensioner of claim 1, wherein said bore cup member is constructed of a drawn metal.

4. The hydraulic tensioner of claim 1, wherein said piston is constructed of a drawn metal.

5. The hydraulic tensioner of claim 1, wherein said bore cup member is retained in said bore by frictional contact between said bore and said bore cup member outer surface.

6. The hydraulic tensioner of claim 1, wherein said piston housing is constructed of aluminum.

7. The hydraulic tensioner of claim 1, wherein said piston housing is constructed of plastic.

8. The hydraulic tensioner of claim 1, wherein said piston housing is constructed of iron.

* * * * *